United States Patent
Xu

(10) Patent No.: US 9,250,449 B2
(45) Date of Patent: Feb. 2, 2016

(54) LIQUID CRYSTAL DISPLAY, SYSTEM AND METHOD FOR DISPLAYING THREE-DIMENSIONAL STEREO PICTURES

(75) Inventor: Shuang Xu, Shenzhen (CN)

(73) Assignee: NVIDIA Corporation, Santa Clara, CA (US)

( * ) Notice: Subject to any disclaimer, the term of this patent is extended or adjusted under 35 U.S.C. 154(b) by 1117 days.

(21) Appl. No.: 13/084,466

(22) Filed: Apr. 11, 2011

(65) Prior Publication Data

US 2011/0248993 A1 Oct. 13, 2011

(30) Foreign Application Priority Data

Apr. 12, 2010 (CN) .......................... 2010 1 0144797

(51) Int. Cl.
| | |
|---|---|
| H04N 13/00 | (2006.01) |
| H04N 13/04 | (2006.01) |
| H04N 15/00 | (2006.01) |
| G02B 27/26 | (2006.01) |
| G02B 27/22 | (2006.01) |
| G02F 1/1347 | (2006.01) |

(52) U.S. Cl.
CPC ............ *G02B 27/26* (2013.01); *G02B 27/2242* (2013.01); *H04N 13/0438* (2013.01); *H04N 13/0497* (2013.01); *G02F 1/13471* (2013.01)

(58) Field of Classification Search
None
See application file for complete search history.

(56) References Cited

U.S. PATENT DOCUMENTS

| | | | | |
|---|---|---|---|---|
| 5,600,459 | A * | 2/1997 | Roy et al. ......................... | 349/42 |
| 5,629,798 | A * | 5/1997 | Gaudreau ...................... | 359/465 |
| 5,963,371 | A | 10/1999 | Needham et al. | |
| 6,181,303 | B1 * | 1/2001 | Johnson et al. ..................... | 345/7 |
| 7,372,523 | B2 * | 5/2008 | Grip ................................ | 349/74 |
| 8,044,879 | B2 * | 10/2011 | Matveev et al. ................... | 345/4 |
| 8,432,371 | B2 * | 4/2013 | Hotelling .............. | G06F 3/0412 345/104 |
| 8,451,244 | B2 * | 5/2013 | Hotelling .............. | G06F 3/0412 345/104 |
| 8,552,989 | B2 * | 10/2013 | Hotelling ............ | G02F 1/13338 345/104 |
| 8,629,898 | B2 * | 1/2014 | Guillou et al. ................... | 348/43 |
| 8,654,083 | B2 * | 2/2014 | Hotelling ............ | G02F 1/13338 345/173 |

(Continued)

FOREIGN PATENT DOCUMENTS

| | | |
|---|---|---|
| CN | 1254241 | 5/2000 |
| CN | 101359099 | 2/2009 |
| CN | 101551984 | 10/2009 |

*Primary Examiner* — William C Vaughn, Jr.
*Assistant Examiner* — Lindsay Uhl
(74) *Attorney, Agent, or Firm* — Zilka-Kotab, PC

(57) ABSTRACT

A three-dimensional stereo display, and a system and method are provided for controlling the three-dimensional stereo display. The three-dimensional stereo display includes backlight, a first polarizer, a first liquid crystal panel, a second polarizer and a second liquid crystal panel which are sequentially arranged on the backlight source. The second liquid crystal panel switches the polarizing angle of the light travelling through and exiting from said second liquid crystal panel between a horizontal and vertical polarization. Due to the polarization direction of light could be changed by the liquid crystal panel, and makes the light for the left-eye image and the right-eye image are mutual perpendicular. The polarization direction of the light for the left-eye image is the same as that of the left lens, and the polarization direction of the light for the right-eye image is the same as that of the right lens. So the light belongs to the left-eye image or the right-eye image can pass through the left lens or the right lens respectively, then a stereo image will emerge in people's brain due to the effect of "fusion activity". Further, there is no need to close the polarized spectacles, the displaying efficiency is improved compared with the "Active Stereo".

20 Claims, 8 Drawing Sheets

(56) References Cited

U.S. PATENT DOCUMENTS

| | | | | |
|---|---|---|---|---|
| 2002/0075428 A1* | 6/2002 | Saiki et al. | ............ | 349/96 |
| 2006/0044498 A1* | 3/2006 | Lee et al. | ............ | 349/117 |
| 2006/0284894 A1* | 12/2006 | Johnson et al. | ............ | 345/690 |
| 2009/0002612 A1* | 1/2009 | Tamaki | ............ | G02F 1/133784 349/117 |
| 2009/0046214 A1* | 2/2009 | Park et al. | ............ | 349/15 |
| 2010/0045640 A1* | 2/2010 | Park | ............ | G02B 27/26 345/205 |
| 2010/0066927 A1* | 3/2010 | Chang | ............ | 349/15 |
| 2010/0302353 A1* | 12/2010 | Lee et al. | ............ | 348/58 |

* cited by examiner

LIQUID CRYSTAL DISPLAY, SYSTEM AND METHOD FOR DISPLAYING THREE-DIMENSIONAL STEREO PICTURES

CLAIM OF PRIORITY

The present application claims the priority of Chinese Patent Application No. 201010144797.4, filed Apr. 12, 2010, which is incorporated herein by reference.

FIELD OF INVENTION

The present invention relates to video displays, and more particularly to liquid crystal display, system and method for displaying three-dimensional stereo pictures.

BACKGROUND OF THE INVENTION

With the development of the technology of three-dimensional (3D) stereo display, 3D stereo displays are used in many fields, such as mobile communication terminals, TV, computer, Car Monitor and so on. 3D application will enter people's daily life more deeply. The mechanism of seeing 3D) stereo image by human eyes is in that everything seen by the left eye and right eye respectively is different in angle because there is a distance between the left eye and right eye. So there will be a little difference in the images caught by the left eye and right eye respectively, which is called "parallax". People will feel the depth and the stereo when the two different images are processed by human brains. Then the 3D stereo images are generated inside the human's brain.

Nowadays, there are two main stereo image generation technologies, one is "Active Stereo", which is also called "division of active stereo stereopair", the other one is "Passive Stereo", which is also called "division of passive stereo stereopair". As shown in FIG. 1, the principle of "Active Stereo" is in that the left-eye image and the right-eye image are displayed alternately on a monitor, and a pair of shading glasses which is controlled by an infrared transmitter is needed in order to observe the images. As soon as the left-eye image is displayed on the monitor, the left eye can see the left-eye image because the left lens is opened by the signal send out by the infrared transmitter, which makes the beam of light rendering the left-eye image pass the left lens. The right eye cannot see any image because the right lens is closed at that moment. When the right-eye image for right eye is displayed on the monitor, the right lens is opened while the left lens is closed, which are controlled by the signal send out from the infrared transmitter. People can feel in this way the "parallax" due to the "retention effect" in human's brain. So the left-eye image and the right-eye image compose a stereo image. However, the disadvantages of this technology is in that it will take some time to finish the alternation of the left-eye image and the right-eye image since the image is displayed row by row, and it will lead that a part of the right-eye image and a part of the left-eye image are displayed on the monitor at the same time. The shading glasses are needed to be closed during these periods to avoid the "image overlapping". However, longer the lenses are opened, more beam of light will pass the lens. The closing of the shading glasses will result in that the image which people see becomes dark.

As shown in FIG. 2, the principle of "Passive Stereo" is in that the polarization directions of the left-eye image and the right-eye image are made to be mutual perpendicular, and the pixel of the odd row of the left-eye image is extracted, then the even row of the right-eye image is extracted, and the image displayed on the monitor finally is formed by the fusion of those left-eye image of the odd row and right-eye image of the even row which are extracted. People need to wear a pair of polarized spectacles to see the images. The difference of the polarization directions between the two lenses is 90 degree, so the left-eye image and the right-eye image can pass the lenses respectively. A stereo image will be formed as soon as the "parallax" is generated in people's brain. There are also some disadvantages of this technology. For example, the resolution of the image in 3D) mode is only a half of that in 2D mode, because half of the pixels ware extracted. That may result in the "blinking phenomenon" especially when the precise image and the still image are displayed, and the visual perception experiences will be lowered.

As a result, a display and method for displaying stereo images which will not decrease the resolution of the image and have sufficient displaying luminance is needed.

SUMMARY OF THE INVENTION

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In consideration of the above-identified need, a liquid crystal display (LCD) for displaying three-dimensional stereo pictures, comprising a backlight source; a first polarizer, a first liquid crystal panel, a second polarizer and a second liquid crystal panel sequentially arranged on said backlight source; wherein said second liquid crystal panel is used to switch the polarizing angle of the light traveling through and exiting from said second liquid crystal panel between a horizontal and vertical polarization.

According to another aspect of the present invention, a system for displaying three-dimensional stereo pictures is provided. The system comprises a liquid crystal displays (LCD) for displaying a left-eye image and a right-eye image alternately, said LCD comprises a backlight source, and a first polarizer, a first liquid crystal panel, a second polarizer and a second liquid crystal panel sequentially arranged on said backlight source, wherein said second liquid crystal panel is used to switch the polarizing angle of the light traveling through and exiting from said second liquid crystal panel between a horizontal and vertical polarization; a graphics processor unit (GPU) for sending the signal for controlling said second liquid crystal panel, and to make said second liquid crystal panel switch the polarizing angle of the light traveling through and exiting from said second liquid crystal panel between a horizontal and vertical polarization.

According to another aspect of the present invention, a method for displaying three-dimensional stereo pictures is provided. The method comprises the steps of controlling a left-eye image and a right-eye image to be displayed on a liquid crystal displays (LCD) alternately, said LCD comprises a backlight source, and a first polarizer, a first liquid crystal panel, a second polarizer and a second liquid crystal panel sequentially arranged on said backlight source; controlling said second liquid crystal panel in such a way that the polarizing angle of the light traveling through and exiting from said second liquid crystal panel is switched between a horizontal and vertical polarization.

Other features and embodiments are described below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION in the following description, lots of details are shown to get better understanding of the invention. However, it is obviously that the invention can be realized without one of or more of those details. To avoid confusing, some technical parameters which were well known are not described in other embodiments.

Figure 1:
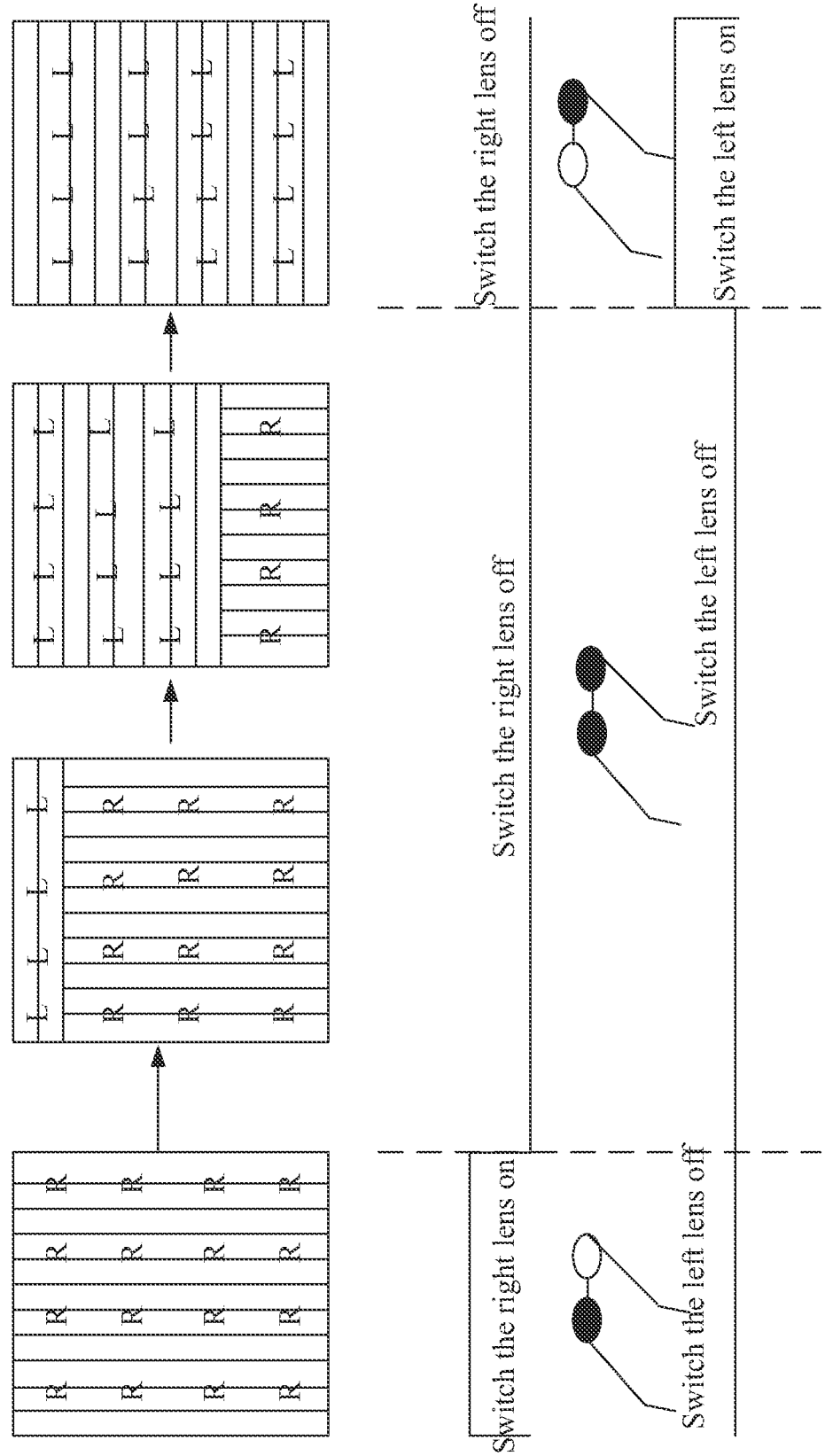
FIG. 1 illustrates the principle of the division of active stereo stereopair in the prior art.
Figure 2:
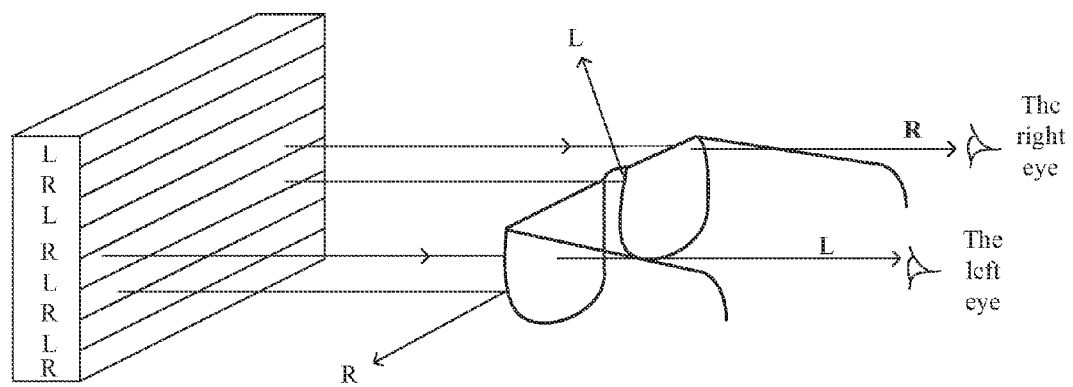
FIG. 2 illustrates the principle of the division of passive stereo stereopair in the prior art.
Figure 3:
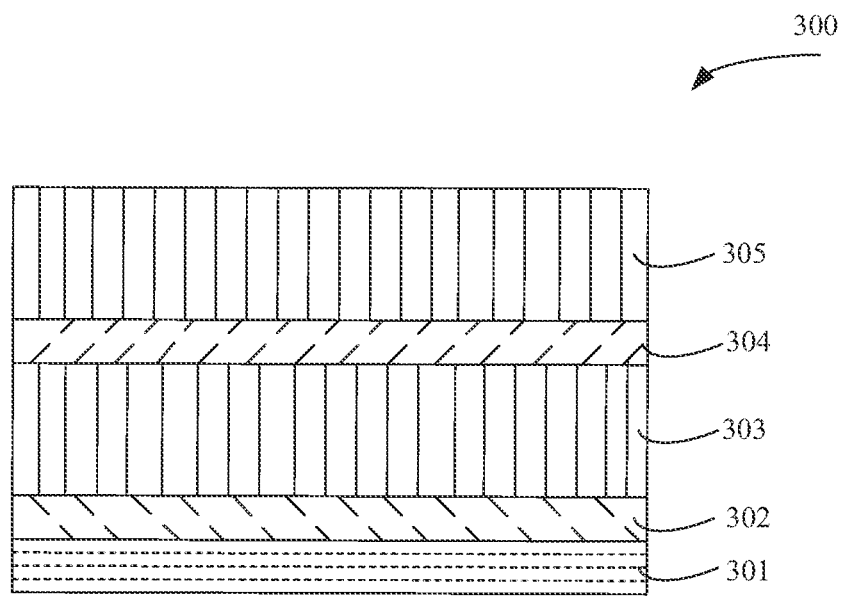
FIG. 3 illustrates the structure of 3D stereo display according to the present invention.

FIG. 3 illustrates a 3D stereo display 300 according to the present invention, which includes a backlight source 301, a first polarizer 302, a first liquid crystal panel 303, a second polarizer 304 and a second liquid crystal panel 305 which are sequentially arranged on the backlight source 301. The polarization direction of the first polarizer 302 and the second polarizer 304 are mutual perpendicular.

Figure 4:
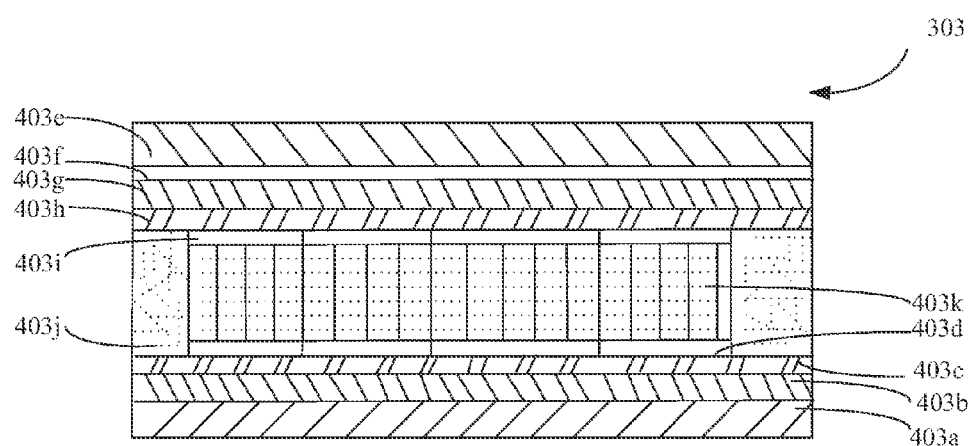
FIG. 4 illustrates the structure of the first (or the second) liquid crystal panel according to the present invention.

FIG. 4 shows the structure of the first liquid crystal panel 303 as shown in FIG. 3. The first liquid crystal panel 303 includes a first glass substrate 403a, a transparent electrode 403b, a ITO (Indium Tin Oxides) film 403c and a orientation film 403d which are sequentially arranged on the first glass substrate 403a. The first liquid crystal panel 303 also includes a second glass substrate 403e, a color filter 403f, a transparent electrode 403g, a ITO (Indium Tin Oxides) film 403h and a second orientation film 403i which are sequentially arranged on the second glass substrate 403e. The extension direction of the grooves on the orientation film 403d is mutual perpendicular with those grooves on the second orientation film 403i. The edges of the first glass substrate 403a and second glass substrate 403e are bonded with adhesives. There are liquid crystal layer 403k between the orientation film 403d and the second orientation film 403i. The arrangement of the liquid crystal layer 403k is 90 degrees twisted. The arrangement of the liquid crystal molecules remains 90 degrees twisted without applying any external electrical field. So it will result in that the polarization direction of the light passing through the liquid crystal layer 403k changes 90 degrees.

The polarization direction of the light which passes through the second liquid crystal panel 305 will change by the changes of the twisted arrangement angle of the liquid crystal molecules, and the changes of the twisted arrangement angle of the liquid crystal molecules is controlled by the external electrical field which is applied on both sides of the liquid crystal layer. The inner instruction of the second liquid crystal panel 305 can be same as the first liquid crystal panel 303, and they are both TN (Twisted Nematic) liquid crystal layer. The character of the TN liquid crystal layer is in that the polarization direction of the light which passes through the TN liquid crystal layer will change 90 degrees when the applied electrical field is removed. While the polarization direction of the light will be same as before it passes through the TN liquid crystal layer when the electrical field is applied. In a word, the polarization direction of the light which passes through the second liquid crystal panel 305 could change 0 degree or 90 degree. Further, the second liquid crystal panel 305 could be a STN (Super Twist Nematic) liquid crystal panel, and the polarization direction of the light which passes through the STN liquid crystal could change 180~270 degrees. It should be understood by those skilled in the art that any kind of liquid crystal panel which can change 90 degrees of the light polarization direction could be used as the second liquid crystal panel 305.

The second polarizer 304 and the second liquid crystal panel 305 are bonded with adhesives.

Figure 5:
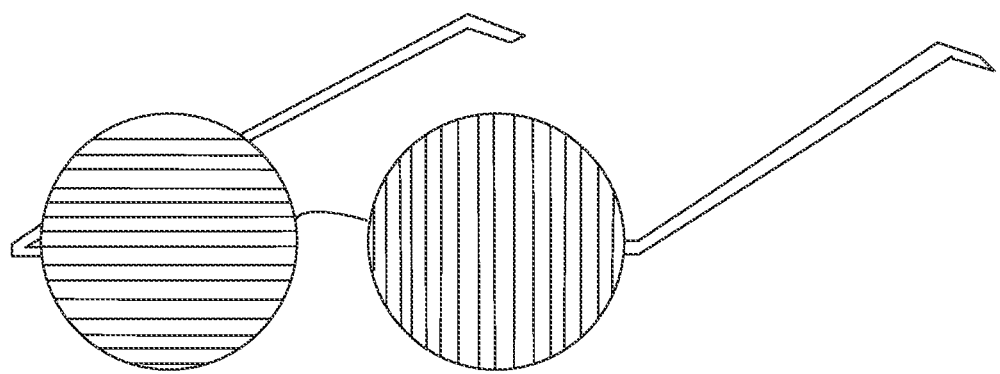
FIG. 5 illustrates the structure of the polarized spectacles according to the present invention.

As shown in FIG. 5, a pair of polarized spectacles is needed when the liquid crystal panel according to this invention is to display 3D) pictures. Although the polarized spectacles is shown as it, includes two pieces of long components, but it can the replaced by any other components which could be supported on people's face. Such as headbands, helmet and so on.

The polarization direction of the left and the right lens are mutual perpendicular. For example, if the polarization direction of the left lens is horizontal, only the image whose polarization direction is horizontal will pass through it. While the polarization direction of the right lens is vertical, only the image whose polarization direction is vertical will pass through it. Otherwise, when the polarization direction of the left lens is vertical, only the image whose polarization direction is vertical will pass through it, and when the polarization direction of the right lens is horizontal, only the image whose polarization direction is horizontal will pass through it. Because the polarization direction of the light which for the left-eye image and the right-eye image are mutual perpendicular after exiting from the second liquid crystal panel 305, the polarization directions of the left and the right lens are same as the left and the right-eye image's polarization directions respectively. It will make the left and the right-eye image pass through the left and the right lens, and then the left and the right eye of the viewer could see the images respectively.

Exemplary Embodiment 1

As shown in FIG. 3, as an example, the polarization direction of the first polarizer 302 is horizontal, the polarization direction of the second polarizer 304 is vertical, the second liquid crystal panel 305 is TN liquid crystal panel, the polarization direction of the left lens is horizontal, and the right lens is vertical. The changing process of the polarization direction of the light passing through the first polarizer 302, the first liquid crystal panel 303, the second polarizer 304 and the second liquid crystal panel 305 sequentially will be interpreted as below.

The left-eye image is displayed at first. The polarization direction of the light for the left-eye image will become horizontal after passing through the first polarizer 302. The signal sent from the GPU controls the electrical field applied on the first liquid crystal panel 303, and the liquid crystal molecules twist from 0 degree to 90 degree. Due to that the polarized plane of the incident light will deflect along with the twisted screw axis of the liquid crystal molecules, which cause an angle between the polarized plane of the incident light and the vertical polarization direction of the second polarizer 304. The angle could be adjusted by the electrical field. Then the amount of the light could be adjusted by the electrical field, and the brightness of the picture could be adjusted.

Next, due to the vertical polarization direction of the second polarizer 304, the polarization direction of the light for the left-eye image which exits from the second polarizer 304 becomes vertical, and then the light incidents the second liquid crystal panel 305. The electrical field applied on the second liquid crystal panel 305 is removed under the control of the GPU. It makes the polarization direction of the light which passes through the second liquid crystal panel 305 deflects 90 degrees, and then the polarization direction of the light becomes horizontal. Then it passes through the left lens whose polarization direction is horizontal.

Similarly, when the right-eye image is displayed later, the light for the right-eye image incidents the second liquid crystal panel 305. An electrical field is applied on the second liquid crystal panel 305 under the control of the GPU. The liquid crystal molecules do not twist, so the polarization direction of the light for the right-eye image does not twist. That is, it will remain as vertical polarization direction. The light passing through the right lens whose polarization direction is vertical, which makes the right-eye image be seen by the viewer.

Exemplary Embodiment 2

As another example, the polarization direction of the first polarizer 302 is horizontal, the polarization direction of the second polarizer 304 is vertical, the second liquid crystal panel 305 is STN liquid crystal panel, the polarization direction of the left lens is vertical, and the right lens is horizontal. The changing process of the polarization direction of the light passing through the first polarizer 302, the first liquid crystal panel 303, the second polarizer 304 and the second liquid crystal panel 305 sequentially will be interpreted as below.

The left-eye image is displayed at first. The polarization direction of the light for the left-eye image will become horizontal after passing through the first polarizer 302. The signal sent from the GPU controls the electrical field applied on the first liquid crystal panel 303, and the liquid crystal molecules twist from 0 degree to 90 degree. Due to that the polarized plane of the incident light will deflect along with the twisted screw axis of the liquid crystal molecules, which cause an angle between the polarized plane of the incident light and the vertical polarization direction of the second polarizer 304. The angle could be adjusted by the electrical field. Then the amount of the light could be adjusted by the electrical field, and the brightness of the picture could be adjusted.

Next, due to the vertical polarization direction of the second polarizer 304, the polarization direction of the light for the left-eye image which exits from the second polarizer 304 becomes vertical, and then the light incidents the second liquid crystal panel 305. The electrical field applied on the second liquid crystal panel 305 is controlled by the control signal sent from GPU, which makes the polarization direction of the light which passes through the second liquid crystal panel 305 deflects 180 degrees, and then the polarization direction of the light is still vertical. Then it passes through the left lens whose polarization direction is vertical.

Similarly, when the right-eye image is displayed later, the light for the right-eye image incidents the second liquid crystal panel 305. An electrical field applied on the second liquid crystal panel 305 is under the control of the GPU. The liquid crystal molecules twist 270 degrees, so the polarization direction of the light for the right-eye image deflects 270 degrees. That is, it will become as horizontal polarization direction. The light passing through the right lens whose polarization direction is horizontal, which makes the right-eye image be seen by the viewer.

Exemplary Embodiment 3

Still as another example, the polarization direction of the first polarizer 302 is horizontal, the polarization direction of the second polarizer 304 is vertical, the second liquid crystal panel 305 is TN liquid crystal panel, the polarization direction of the left lens is vertical, and the right lens is horizontal. The changing process of the polarization direction of the light passing through the first polarizer 302, the first liquid crystal panel 303, the second polarizer 304 and the second liquid crystal panel 305 sequentially will be interpreted as below.

The left-eye image is displayed at first. The polarization direction of the light for the left eye image will become horizontal after passing through the first polarizer 302. The signal sent from the GPU controls the electrical field applied on the first liquid crystal panel 303, and the liquid crystal molecules twist from 0 degree to 90 degree. Due to that the polarized plane of the incident light will deflect along with the twisted screw axis of the liquid crystal molecules, which cause an angle between the polarized plane of the incident light and the vertical polarization direction of the second polarizer 304. The angle could be adjusted by the electrical field. Then the amount of the light could be adjusted by the electrical field, and the brightness of the picture could be adjusted.

Next, due to the vertical polarization direction of the second polarizer 304, the polarization direction of the light for the left-eye image which exits from the second polarizer 304 becomes vertical, and then the light incidents the second liquid crystal panel 305. The electrical field will be applied on the second liquid crystal panel 305 under the control of the GPU. It makes the polarization direction of the light which passes through the second liquid crystal panel 305 does not deflects, and then the polarization direction of the light will be still vertical. Then it passes through the left lens whose polarization direction is vertical.

Similarly, when the right-eye image is displayed later, the light for the right-eye image incidents the second liquid crystal panel 305. An electrical field applied on the second liquid crystal panel 305 is removed under the control of the GPU. The liquid crystal molecules twist 90 degrees, so the polarization direction of the light for the right-eye image deflects 90 degrees. That is, it will become horizontal polarization direction. The light passing through the right lens whose polarization direction is horizontal, which makes the right-eye image be seen by the viewer.

In a similar way as above, the polarization direction of the first polarizer 302 is vertical and the polarization direction of the second polarizer 304 is horizontal, the second liquid crystal panel 305 is STN, the polarization direction of the light for the left-eye image or for the right-eye image can be mutual perpendicular under the control of the electrical field applied on the second liquid crystal panel 305. Furthermore, the polarization direction of the light for the left-eye image could be horizontal, while the light for the right-eye image is vertical. In a word, people can see the alternating images at different time when the polarization direction of the light for the left-eye image and for the right-eye image is mutual perpendicular.

Figure 6:
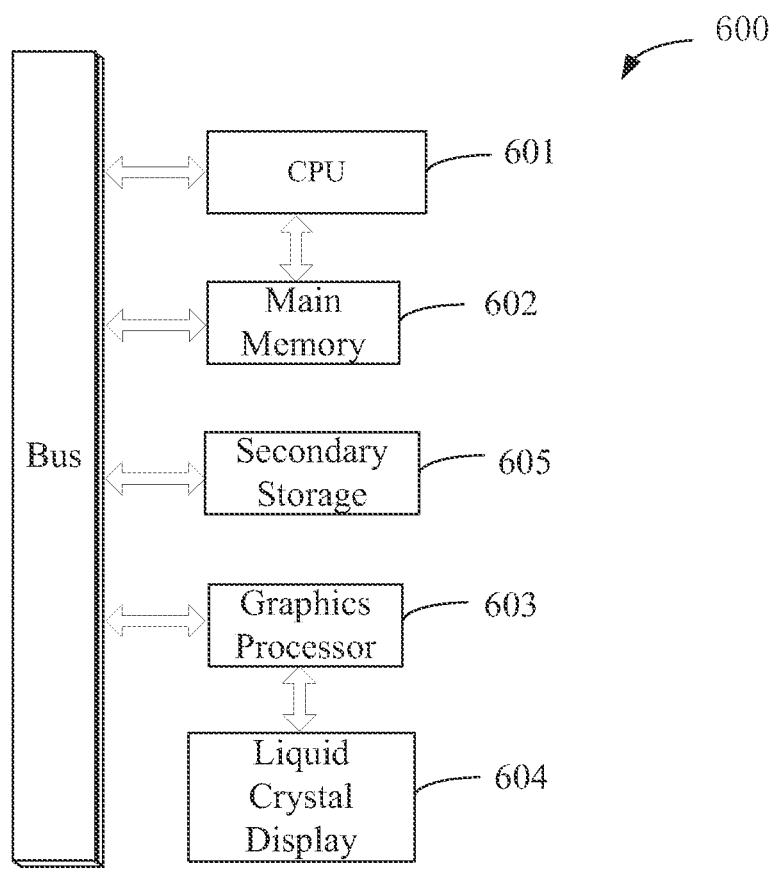
FIG. 6 illustrates the structure of the computer system which controls the 3D stereo display according to the present invention.

FIG. 6 illustrates an exemplary computer system 600 for controlling the display of the 3D stereo images. As shown, the computer system 600 includes at least one host processor 601 which is connected to a communication bus. The computer system 600 also includes a main memory 602. Control logic and data are stored in the main memory 602 which may take the form of random access memory (RAM). The computer system 600 also includes a graphics processor 603 and a liquid crystal display 604 (or the liquid crystal display 300). The host processor 601, the main memory 602, graphics processor 603 and the liquid crystal display 604 are connected to the communication bus. In one embodiment, the graphics processor 603 may include a plurality of shader modules, rasterization modules, etc.

The computer system 600 may also include a secondary storage 605. The secondary storage 605 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, fray be stored in the main memory 602 and/or the secondary storage 605. Such computer programs, when executed, enable the computer system 600 to perform various functions. Memory 602, storage 605 for any other storage are possible examples of computer-readable media.

Figure 7:
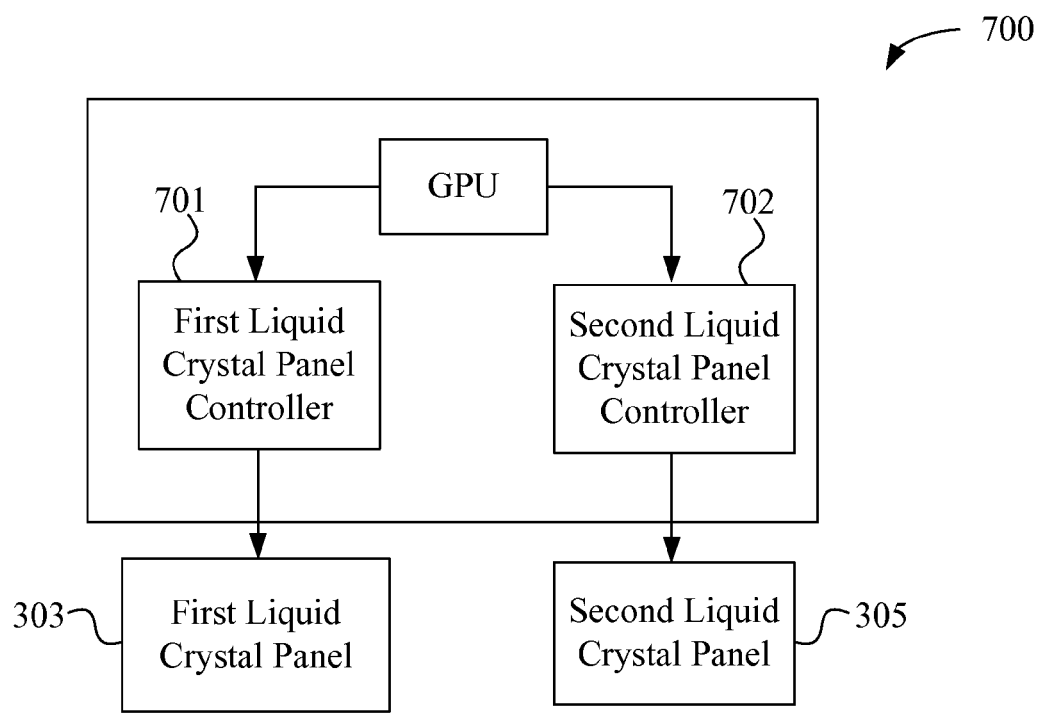
FIG. 7 illustrates the structure of the control unit of the 3D stereo display according to the present invention.

FIG. 7 illustrates the structure of the controller of the 3D stereo display 700 which is arranged in the graphics processor 603 as shown in FIG. 6. The other parts in the graphics processor 603 which is not relevant to this invention are omitted, such as video memory. The controller 700 includes a first liquid crystal panel controller 701 and the second liquid crystal panel controller 702. Two sets of signal which are send out from the GPU (Graphics Processing Unit) are send to the first liquid crystal panel controller 701 and the second liquid crystal panel controller 702 respectively, in order to turn on the electrical field for the liquid crystal layer and then control the deflection angle of the liquid crystal molecules and control the polarization direction of the light in the end. Two sets of signal which are send out from the GPU (Graphics Processing Unit) are send to the first liquid crystal panel controller 701 and the second liquid crystal panel controller 702 respectively, and the signal sent out from the controller 701 is sent to the first liquid crystal panel 303, the signal sent out from the controller 702 is sent to the second liquid crystal panel 305.

Figure 8:
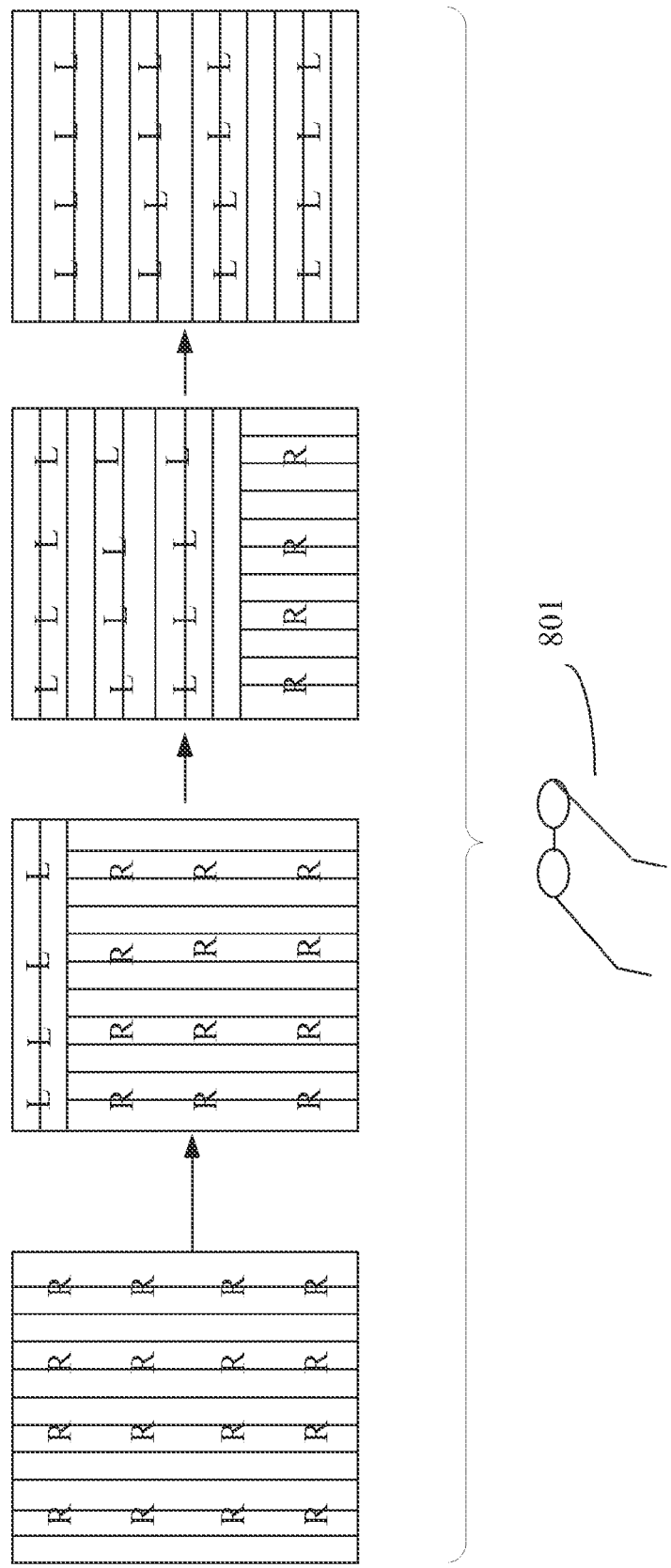
FIG. 8 illustrates the alternation of the left-eye image and the right-eye image displayed on the second liquid crystal panel according to the present invention.

The FIG. 8 illustrates the left-eye image and the right-eye image display alternately on the second liquid crystal panel 305. Because the left-eye image and right-eye image are displayed alternately on the first liquid crystal panel 303, then pass through the second liquid crystal panel 305 alternately, and thus every frame of the image is displayed in the manner of progressive scanning from top to down line by line on the LCD screen, there will be a moment at which a part of left-eye image and right-eye image will be displayed simultaneously on the screen. The polarization direction of light for the left and the right are mutual perpendicular. In all the time, both of the two lenses of the polarized spectacles 801 are switched on, and the light for the left-eye image and for the right-eye image go through the lens respectively which has the correspondent polarization direction.

In order to realize the polarization direction of the light for the left-eye image and the right-eye image are mutual perpendicular after they pass through the second liquid crystal panel 305, the followings are to explain how to use the controller of the 3D stereo display 700 and the exemplary computer system 600, to control the 3D stereo display 300 (or the 3D stereo display 604) and display the 3D stereo image.

Assuming that the polarization direction of the first polarizer 302 is horizontal, the polarization direction of the second polarizer 304 is vertical, and taking the TN type liquid crystal as the second liquid crystal panel 305.

When the light for the left-eye image or for the right-eye image passes through the first polarizer 302, and then enters into the first liquid crystal panel 303, the GPU will send out signals to the first liquid crystal panel controller 701 which controls the brightness of the picture. The controller 701 computes the signal which controls the first liquid crystal panel, and sends it to the first liquid crystal panel 303. So the polarization direction of the light which passes through the first liquid crystal panel 303 can be adjusted by controlling the electrical field.

When the light for the left-eye image or for the right-eye image exits from the second liquid crystal panel 304, the GPU sends out the a determination signal to the second liquid crystal panel controller 702, which signal is to determine whether the picture is a left-eye image or a right-eye image. The second liquid crystal panel controller 702 computes the control signal based on the determination signal, and sends it to the second liquid crystal panel 305. The deflection angle of the liquid crystal molecules will be adjusted by that control signal which controls the electrical field applied on the liquid crystal layer, and makes the light for the left-eye image and for the right-eye image are mutual perpendicular. If the light for the left-eye image incidents the second liquid crystal panel 305, the signal which controls the second liquid crystal panel 305 applied the electrical field row by row at the frequency of progressive scanning, which makes the liquid crystal molecules twist 90 degree. If the next frame is right-eye image, the signal which controls the second liquid crystal panel 305 removed the electrical field row by row, and the liquid crystal molecules will not twist. The polarization direction of the light for the right-eye image becomes horizontal after passing through the second liquid crystal panel 305. As soon as one row of the light incidents the second liquid crystal panel 305, the corresponding electrical field will be applied or removed, which depends on whether the light is for the left-eye image or for the right-eye image.

In the description above, it will be a similar situation where the polarization direction of the first polarizer 302 is vertical, the polarization direction of the second polarizer 304 is horizontal, and the second liquid crystal panel 305 is STN. Also, the polarization direction of the light for the left-eye image is horizontal, and the polarization direction of the light for the right-eye image is vertical. The similarly method is adopted by the controller of the 3D stereo display 700 to make the light for the left-eye image and for the right-eye image are mutual perpendicular.

Since the light for the left-eye image and for the right-eye image emit alternately from the 3D stereo display 300 (or the 3D stereo display 604), and the refresh rate is more faster than the reaction of the people brain, after the light for the left-eye image and for the right-eye image pass through the two lens, then a stereo image will emerge in people's brain due to the effect of "fusion activity".

Because the left-eye image and the right-eye image are displayed row by row, so all the pixel can be displayed at the same time, the resolution is two times as that of the "Passive Stereo" in the prior art. The displaying effect will be much better than the "Passive Stereo". Further, when the left-eye image and the right-eye image are alternating, there is no need to switch the polarized spectacles off, so the displaying efficiency is improved compared with the "Active Stereo".

It is noted that the foregoing examples have been provided merely for the purposes of explanation and are in no way to be construed as limiting of the present invention. While the invention has been described with reference to various embodiments, it is understood that the words which have been used herein are words of description and illustration, rather than words of limitations. Further, although embodiments have been described herein with reference to particular means and materials, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed is:

1. A liquid crystal display (LCD) for displaying three-dimensional stereo images, comprising:
    a backlight source;
    a first polarizer arranged on the backlight source;
    a first liquid crystal panel arranged on the first polarizer and comprising a first transparent electrode, a first indium tin oxide (ITO) film, a first orientation film, a liquid crystal layer, a second orientation film, a second ITO film, a second transparent electrode, and a color filter all sequentially arranged between two glass substrates, where the first liquid crystal layer is controlled by a first electrical field to produce a first polarization direction of light that passes through the first liquid crystal panel when a left-eye image is displayed and is controlled by a third electrical field to produce a third polarization direction of light that passes through the first liquid crystal panel when a right-eye image is displayed, wherein a first controller computes a first signal that applies the first electrical field to produce the first polarization direction and adjust a brightness of the left-eye image when the first signal takes a first value and applies the third electrical field to produce the third polarization direction and adjust a brightness of the right-eye image when the first signal takes a second value;
    a second polarizer arranged on the first liquid crystal panel, wherein a polarization direction of the second polarizer is perpendicular to a polarization direction of the first polarizer; and
    a second liquid crystal panel including a super twist nematic (STN) liquid crystal panel arranged on the second polarizer and comprising a second liquid crystal layer that is controlled by a second electrical field to produce a second polarization direction of light that passes through the second liquid crystal panel when a left-eye image is displayed and is controlled by a fourth electrical field to produce a fourth polarization direction of light that is deflected 270 degrees from the second polarization direction of light and that passes through the second liquid crystal panel when the right-eye image is displayed, wherein a second controller computes a second signal that applies the second electrical field to produce the second polarization direction and applies the fourth electrical field to produce the fourth polarization direction.

2. The LCD of claim 1, wherein a switching frequency at which the second electrical field is changed to produce the fourth polarization direction equals a frequency at which the LCD displays left-eye images and right-eye images alternately.

3. The LCD of claim 1, wherein said LCD is a progressive scanning display.

4. A system for displaying three-dimensional stereo images, comprising, a liquid crystal display (LCD) for displaying a left-eye image and a right-eye image alternately, the LCD comprising:
    a backlight source;
    a first polarizer arranged on the backlight source;
    a first liquid crystal panel arranged on the first polarizer and comprising a first transparent electrode, a first indium tin oxide (ITO) film, a first orientation film, a liquid crystal layer, a second orientation film, a second ITO film, a second transparent electrode, and a color filter all sequentially arranged between two glass substrates, where the first liquid crystal layer is controlled by a first electrical field to produce a first polarization direction of light that passes through the first liquid crystal panel when a left-eye image is displayed and is controlled by a third electrical field to produce a third polarization direction of light that passes through the first liquid crystal panel when a right-eye image is displayed, wherein a first controller computes a first signal that applies the first electrical field to produce the first polarization direction and adjust a brightness of the left-eye image when the first signal takes a first value and applies the third electrical field to produce the third polarization direction and adjust a brightness of the right-eye image when the first signal takes a second value,
    a second polarizer arranged on the first liquid crystal panel, wherein a polarization direction of the second polarizer is perpendicular to a polarization direction of the first polarizer; and
    a second liquid crystal panel including a super twist nematic (STN) liquid crystal panel arranged on the second polarizer and comprising a second liquid crystal layer that is controlled by a second electrical field to produce a second polarization direction of light that passes through the second liquid crystal panel when a left-eye image is displayed and is controlled by a fourth electrical field to produce a fourth polarization direction of light that is deflected 270 degrees from the second polarization direction of light and that passes through the second liquid crystal panel when the right-eye image is displayed, wherein a second controller computes a second signal that applies the second electrical field to produce the second polarization direction and applies the fourth electrical field to produce the fourth polarization direction; and
    a graphics processor unit (GPU) for sending a first signal to adjust the first electrical field and a second signal to adjust the second electrical field.

5. The system of claim 4, further comprising a pair of polarized spectacles, the polarization directions of the left lens and of the right lens of said polarized spectacles are mutual perpendicular.

6. The system of claim 4, wherein the switching frequency of the first signal and the second signal equals a frequency at which the LCD displays left eye images and right-eye images alternately.

7. The system of claim 4, wherein said LCD is a progressive scanning display.

8. A method for displaying three-dimensional stereo images, comprising the steps of;
    controlling a left-eye image and a right-eye image to be displayed on a liquid crystal display (LCD) alternately, the LCD comprising:

a backlight source;

a first polarizer arranged on the backlight source;

a first liquid crystal panel arranged on the first polarizer and comprising a first transparent electrode, a first indium tin oxide (ITO) film, a first orientation film, a liquid crystal layer, a second orientation film, a second ITO film, a second transparent electrode, and a color filter all sequentially arranged between two glass substrates;

a second polarizer arranged on the first liquid crystal panel, wherein a polarization direction of the second polarizer is perpendicular to a polarization direction of the first polarizer; and a second liquid crystal panel including a super twist nematic (STN) liquid crystal panel arranged on the second polarizer and comprising a second liquid crystal layer;

controlling the first liquid crystal layer by a first electrical field to produce a first polarization direction of light that passes through the first liquid crystal panel when a left-eye image is displayed and is controlled by a third electrical field to produce a third polarization direction of light that passes through the first liquid crystal panel when a right-eye image is displayed, wherein a first controller computes a first signal that applies the first electrical field to produce the first polarization direction and adjust a brightness of the left-eye image when the first signal takes a first value and applies the third electrical field to produce the third polarization direction and adjust a brightness of the right-eye image when the first signal takes a second value;

controlling the second liquid crystal layer by a second electrical field to produce a second polarization direction of light that passes through the second liquid crystal panel when a left-eye image is displayed; and controlling the second liquid crystal layer by a fourth electrical field to produce a fourth polarization direction of light that is deflected 270 degrees from the second polarization direction of light and that passes through the second liquid crystal panel when the right-eye image is displayed, wherein a second controller computes a second signal that applies the second electrical field to produce the second polarization direction and applies the fourth electrical field to produce the fourth polarization direction.

9. The method of claim 8, wherein a switching frequency at which the second electrical field is changed to produce the fourth polarization direction equals a frequency at which the LCD displays left-eye images and right-eye images alternately.

10. The method of claim 8, wherein said LCD displays images in the manner of progressive scanning.

11. The LCD of claim 1, wherein the first polarization direction corresponds to 90 degrees and the second polarization direction corresponds to zero degrees.

12. The system of claim 4, wherein the first polarization direction corresponds to 90 degrees and the second polarization direction corresponds to zero degrees.

13. The system of claim 4, wherein the first polarization direction corresponds to 90 degrees and the second polarization direction corresponds to 180 degrees.

14. The method of claim 8, wherein the first polarization direction corresponds to 90 degrees and the second polarization direction corresponds to zero degrees.

15. The LCD of claim 1, wherein a graphics processor unit (GPU) sends brightness control signals to the first controller when light passes through the first polarizer and enters into the first liquid crystal panel.

16. The LCD of claim 1, wherein a graphics processor unit (GPU) sends out a determination signal indicating that the image is either the left-eye image or the right-eye image to the second controller when light exits from the second liquid crystal panel.

17. The system of claim 4, wherein the GPU sends brightness control signals to the first controller when light passes through the first polarizer and enters into the first liquid crystal panel.

18. The system of claim 4, wherein a GPU sends out a determination signal indicating that the image is either the left-eye image or the right-eye image to the second controller when light exits from the second liquid crystal panel.

19. The method of claim 8, wherein a graphics processor unit (GPU) sends brightness control signals to the first controller when light passes through the first polarizer and enters into the first liquid crystal panel.

20. The method of claim 8, wherein a graphics processor unit (GPU) sends out a determination signal indicating that the image is either the left-eye image or the right-eye image to the second controller when light exits from the second liquid crystal panel.

* * * * *